INVENTORS.
Ledger J. Tordoff
Max Rigert
BY
Lee H. Kaiser
ATTORNEY

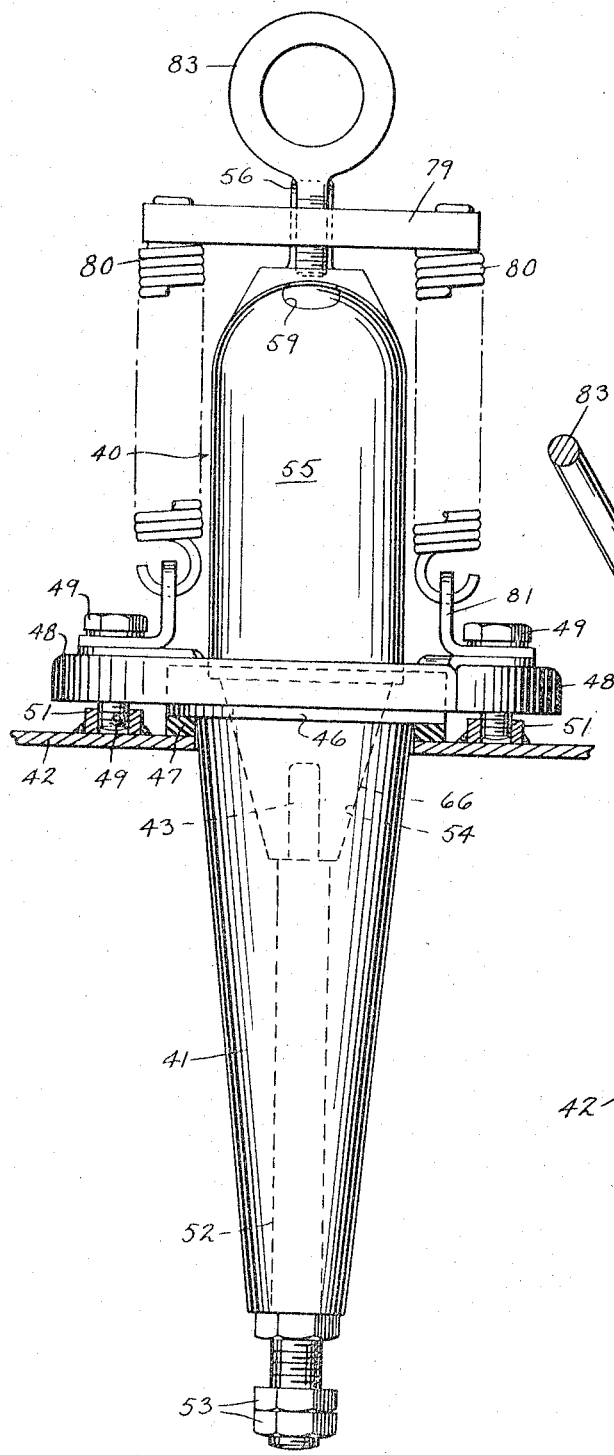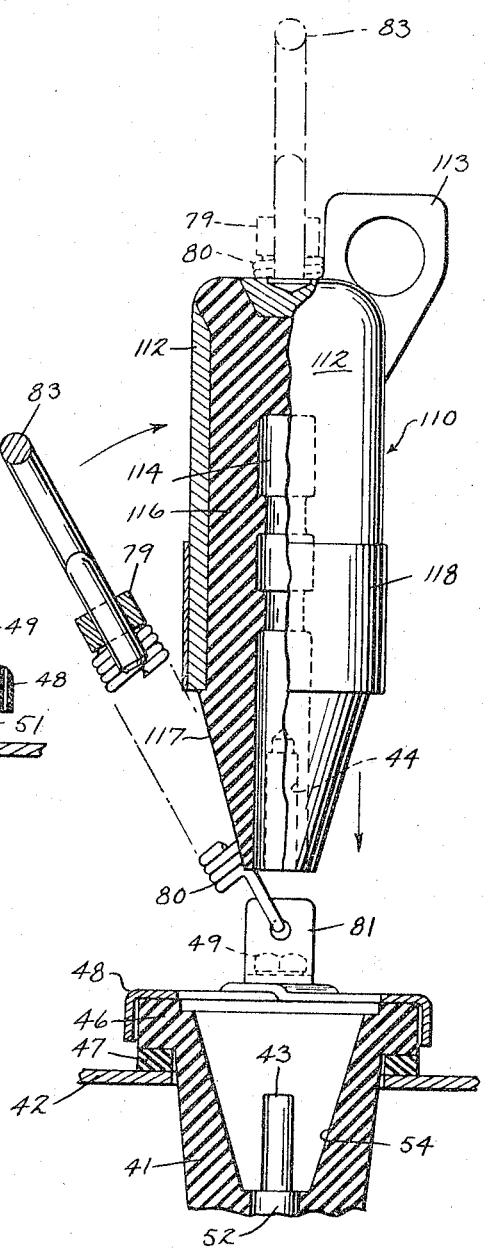

United States Patent Office

3,307,137
Patented Feb. 28, 1967

3,307,137
CONDUCTOR TERMINATION
Ledger J. Tordoff, South Milwaukee, and Max Rigert, West Allis, Wis., assignors to McGraw-Edison Company, Milwaukee, Wis., a corporation of Delaware
Filed May 27, 1965, Ser. No. 459,215
11 Claims. (Cl. 339—61)

This invention relates to end structures for high voltage conductors such as shielded electrical cables and, in particular, to separable connectors and terminations for high voltage conductors.

Cables having a grounded conductive outer coating, or sheath, are used on electrical power distribution systems above five kilovolt rating to carry charging current to ground, to protect personnel, and to prevent the generation of radio noise. Electrical stresses in shielded cables are radial in direction, and consequently it is unnecessary to maintain high longitudinal dielectric strength in the cable insulation. The ground shield may comprise a thin layer of conductive or semiconductive material adjacent the outermost layer of cable insulation which constitutes, in effect, an equipotential surface concentric with the axis of the cable conductor. This equipotential surface causes the electrical field distribution around the cable conductor to be radial, with zero gradients in the longitudinal direction of the cable. However, at the cable end where the sheathing, or conductive shield is removed from around the cable insulation, high longitudinal voltage gradients may occur. The ground shield must be removed sufficiently far back from the exposed cable conductor to prevent electrical flashover of the air between the exposed conductor and the ground shield and to prevent electrical breakdown along the creepage path on the surface of the cable insulation between these points. However, this results in excessive potential gradients near the edge of the ground shield. Additional insulation and a generally bell-shaped extension to the ground shield, called a dielectric stress relief cone, are commonly used to minimize the longitudinal gradients on the cable surface at the end of the shield. Such stress cones are commonly fabricated by wrapping turns of tape insulation and conductive tape into the shape of a double-ended cone having a diameter greater than that of the cable. This construction transfers the termination shielding edge from the cable surface to the crest of the stress relief cone and thus increases the dielectric strength. Such stress cones require considerable skill to construct and are time-consuming and expensive to fabricate and further they add considerably to the cost of a power distribution system which requires such a stress cone at each cable termination such as at each distribution transformer.

Stress cones are dependent upon the skill of the workman who winds the tape and are often unpredictable in their dielectric quantities because of air spaces, poor centering, and lack of homogeneity of the insulating material. When the atmosphere contains contaminants such as carbon, sulfur deposits, industrial waste, or salt, the surface of the stress relief cone may become eroded and contaminated to the point that tracking resistance is lowered, thereby requiring the use of a so-called pothead filled with an insulating compound to house the stress cone. Potheads require excessive height when installed in an underground vault because of the restricted bending radius of the cable, and further potheads are difficult to install and present a problem in obtaining void-free filling of the space between the porcelain body of the pot-heat and the cable termination structure. Such voids in the filling compound contain low pressure gas occlusions of low dielectric strength which become the initial points of ionization and consequent deterioration of the insulation.

Stress cones and potheads do not permit disconnection of the cable for the purpose of allowing personnel to safely maintain or repair the electrical apparatus to which the cable is connected. Standard operating and safety practices for utilities require the ability to provide a visible open after sectionalizing the power line, and this is impossible with stress cones and potheads.

Ionization of the air adjacent mating parts at a cable joint due to electrical stress between the "hot" conductor and the ground shield gives rise to ionization and corona and consequent deterioration of the insulation which restricts the use of connectors in high voltage shielded cables and necessitates elaborate and expensive arrangements such as capacitive grading means to control the voltage gradients at cable joints and terminations.

It is an object of the invention to provide a high voltage termination which eliminates manually wound stress cones and potheads filled in the field with poured insulating compound and which uses prefabricated components and yet has high dielectric and high creep strength and controls the electrostatic field and prevents concentration of lines of force adjacent the end of the cable sheath, thereby eliminating the danger of generation of corona and radio noise and the danger of deterioration of the insulation.

It is a further object of the invention to provide a high voltage termination which has a continuous grounded outer sheath that guarantees safety to personnel and provides a dead front and also has an inherently long creepage path between hot and grounded members and provides a force fit between resilient insulating surfaces along such creepage path which positively prevents low dielectric strength air occlusions and wherein change of dimensions of the insulating material due to thermal variations increases the degree of compression between the mating insulating members rather than merely "extruding" the insulating material outwardly.

It is an object of a preferred embodiment of such high voltage termination to provide a separable connector having a metallic outer casing which is always at ground potential and guarantees complete safety to personnel and provides a dead front for the apparatus and permits establishing a visible open in the cable before the lineman works on the electrical apparatus connected to the cable in accordance with standard operating and safety practises of utilities; which can be opened by a hook stick; which requires considerable less space when installed in a vault than a pothead; and which is completely waterproof and capable of direct burial in the ground or immersion in water.

The cable termination of the invention is an improvement over the structure disclosed in the copending application Serial No. 390,145, of Ledger J. Tordoff, filed August 17, 1964, and having the same assignee as the subject invention, and the cable termination of the invention, in comparison to the construction disclosed in the aforesaid application Serial No. 390,145, has greater length of creepage and flashover paths; can be used over a wider temperature range without danger of generation of corona or deterioration of the insulation; provides more positive protection against the possibility of air voids along the shortest creepage paths between energized and grounded elements; has more positive seal against entry of moisture; is easier to assemble on the cable in the field and permits use of simpler tools to install; and utilizes changes in dimensions resulting from temperature variations to increase the degree of compression between the complementary insulating members at the joint which provide the hermetic seal and along which the shortest creepage path exists rather than merely "extruding" the insulating material outwardly.

These and other objects and advantages of the invention will be more readily apparent from the following detailed description when considered in conjunction with the accompanying drawing wherein:

FIG. 2 is an elevation view, partly in section, of the embodiment of FIG. 1 taken at right angles to the view of FIG. 1 and showing the normal engaged position of connector and bushing; and FIG. 3 is a vertical sectional view through an alternative embodiment of termination in accordance with the invention.

Figure 1:
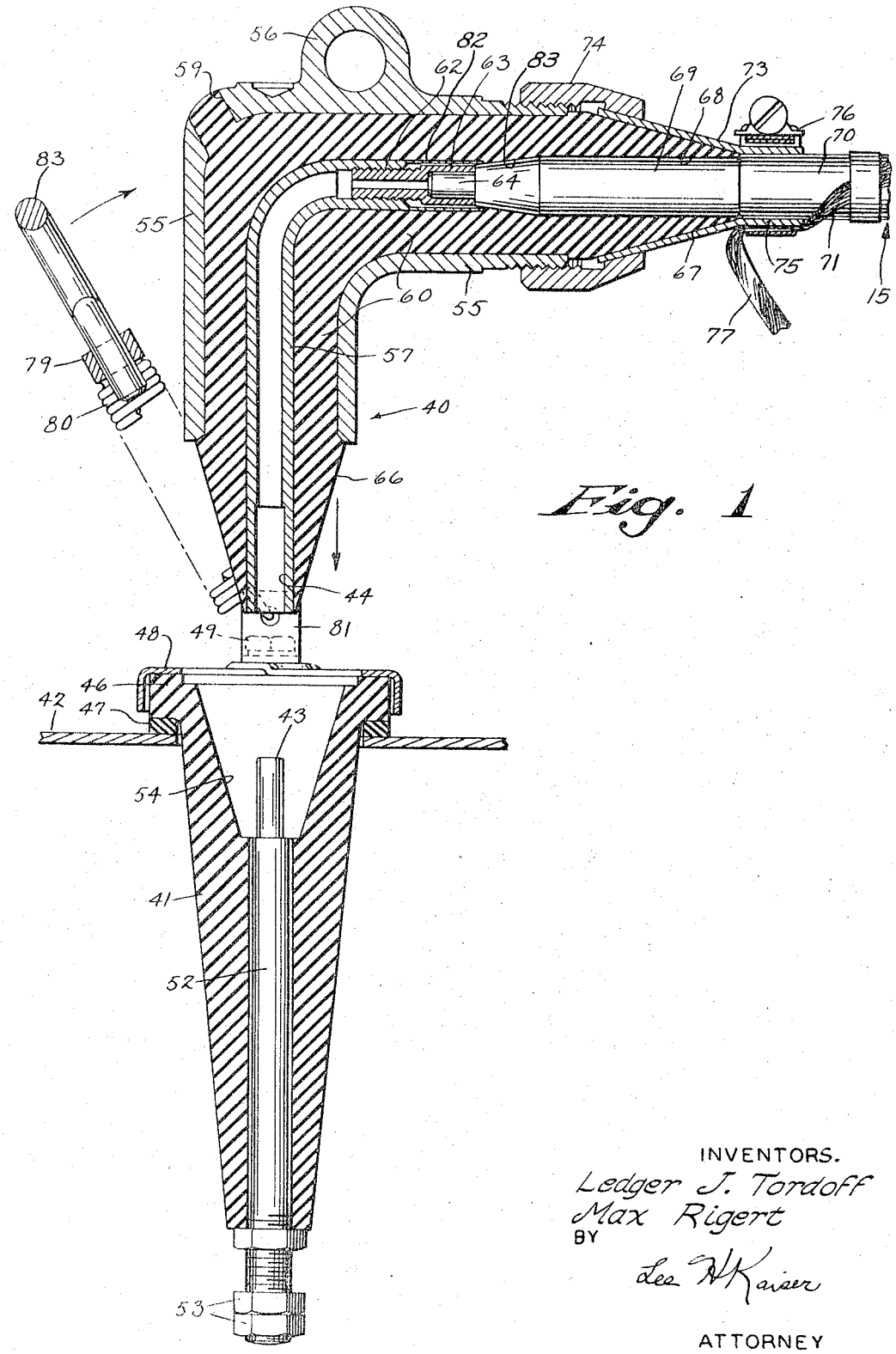
FIG. 1 is a vertical sectional view through a preferred embodiment of cable termination in accordance with the invention showing the bushing and connector disengaged.

Referring to FIGS. 1 and 2 of the drawing, the invention is illustrated as embodied in a separable elbow connector 40 for a shielded cable 15 which may be quickly and easily disconnected from high voltage electrical apparatus such as a distribution transformer (not shown) housed in a metallic casing 42 which is preferably grounded. The electrical apparatus housed within casing 42 may have a high voltage conductor (not shown) crimped or swaged to a metallic terminal provided with an eye (not shown) which fits over the threaded end of a conductor stud 52 within the casing 42 and is secured thereto by nuts 53. Conductor stud 52 is preferably molded within a bushing 41 of suitable insulating material such as epoxy or silicone resin which extends through an aperture in casing 42 and is provided with an upwardly extending metallic male connector member, or bayonet 43 adapted to mate with a complementary metallic female connector member, or receptacle 44 of the elbow connector 40. Insulating bushing 41 is generally of frustoconical configuration and has an outwardly extending circumferential flange 46 disposed against the exterior of casing 42 with a resilient gasket 47 compressed therebetween to provide a hermetic seal for casing 42. A split clamp 48 disposed against bushing flange 46 has clearance apertures therein which receive clamping bolts 49 engaged within internally threaded bosses 51 welded to casing 42 to rigidly affix insulating bushing 41 to casing 42 and compress gasket 47. Insulating bushing 41 has a frustoconical compartment 54 at its upper end.

Elbow connector 40 permits making a right angle connection from the shielded high voltage cable 15 to the insulating bushing 41 in considerably less space than would be required for a pothead cable termination because of the restricted bending radius of the cable. Connector 40 includes an outer tubular body member 55 of suitable material such as aluminum having a right angle bend therein. Elbow body member 55 has an eye 56 to permit installation and removal by a hot-stick, and outer body member surrounds an interchange L-shaped member 57 of high conductivity material such as copper disposed within elbow body member 55 in spaced relation to the inner surface thereof. A suitable resilient insulating material having high dielectric strength and high surface resistivity such as silicone rubber is poured within outer body member 55, preferably at the factory, through an aperture 59 and cured therein to form a tubular insulating member 60 between interchange member 57 and body member 55. Interchange member 57 terminates at one end in the receptacle 44 and at the opposite end in a female connector portion, or receptacle 62 having internal threads adapted to mate with a threaded terminal stud 63 crimped on the conductor 64 of primary cable 15. At the bushing end tubular insulating body member 60 terminates in a frustoconical portion 66 surrounding receptacle 44 and adapted to fit within complementary frustoconical compartment 54 in bushing 41. Insulating body 60 at the cable end also terminates in a frustoconical portion 67 surrounding an axial opening 68 for the insulation 69 of cable 15.

Elbow connector 40 is easily assembled to primary cable 15 in the field without taping and without pouring of potting compound. No special aptitudes, skills or extended training are necessary to make a completely satisfactory termination; the work may be done in midsummer or the bitter cold of winter; no compounds needs be mixed and no curing time is required; and only simple tools such as a hacksaw, a knife, and a pencilling tool are required. Conductor 64 of cable 15 may be surrounded by successive layers of polyethylene insulation 69, semi-conductive material 70, and exposed neutral conductor strands 71. The neutral strands 71 are first laid back to expose approximately twelve inches of the semiconductive material 70; approximately six inches of cable 15 is cut off; the semiconductive layer 70 and insulation 69 are cut back approximately 1½ inches to expose copper conductor 64; approximately three inches of semiconductive layer 70 is removed; the polyethylene insulation 69 is pencilled with a suitable tool; and terminal stud 63 is crimped on cable conductor 64.

A prefabricated, metallic, electrical stress relief member 73 of frustoconical shape and an internally threaded metallic draw nut 74 are placed over cable 15 so that the tubular extension 75 on stress relief member 73 is disposed above the semiconductive material 70 and extends up to the neutral strands 71. The pencilled insulation 69 is then inserted into axial opening 68 in insulating body 60, and terminal stud 63 is engaged within the female threads in receptacle 62. Nut 74 is then engaged with external threads on body member 55, and when nut 74 is tightened, it urges stress relief member 73 firmly against frustoconical portion 67 of resilient body member 60. Neutral strands 71 are then folded over the tubular extension 75 on stress relief member 73 and are secured with a compression type clamp 76 which urges stress relief member 73 against the semiconductive layer 70. Neutral strands 71 are then twisted into a pigtail 77 which may be secured to a grounding rod (not shown) driven into the earth.

Elbow connector 40 may then be engaged by a hook stick inserted within eye 56 and assembled into the insulating bushing 41 so that bayonet 43 mates with receptacle 44. Connector 40 is normally secured to casing 42 by a bridging bar 79 affixed at its ends to tension hold-down springs 80 disposed in diametrically opposite sides of insulating bushing 41 and having hook-shaped ends engaged within apertures in L-shaped brackets 81 which are secured to casing 42 by the same clamping bolts 49 which affix the split clamp 48 thereto. A threaded aperture at the center of bridging bar 79 receives an eyebolt 83 adapted to accommodate a hook stick, and bridging bar 79 may be lifted over body member 55 and the eyebolt 83 turned by means of the hook stick until eyebolt 83 abuts against body member 55 of elbow connector 40, whereby further rotation of eyebolt 83 will tension hold-down springs 80 and thus urge elbow connector 40 against insulating bushing 41. The silicone rubber of insulating body 60 is resilient, and tensioned hold-down springs 80 compress the frustoconical portion 66 of insulating body against the complementary compartment 54 in the insulating bushing 41, thus providing a compression fit between the faying frustoconical surfaces on compartment 54 and insulating body 60. Any irregularities in the frustoconical surface defining compartment 54 are urged against the resilient material of the complementary surface 66, thus providing a positive seal against entrance of moisture even under a substantial head of water and insuring that no low dielectric strength air can be trapped between the faying surfaces along the shortest creepage path between grounded elbow member 55 and the "hot" receptacle 44. These mating frustoconical surfaces provide an inherently long creepage path in comparison to a joint between insulating members having radial surfaces. This long creepage path, in combination with the compression fit between resilient surfaces which prevents voids and air occlusions along the creepage path, assures that corona and ionization will not be generated and that no deterioration of the insulation will result. Further, any expansion of the silicone rubber material of insulating body 60 in an axial direction prevents mere lateral "extrusion" of the insulating material and results in a greater degree of compression between the faying frustoconical surfaces, thereby increasing the degree of sealing, the breakdown strength between the "hot" and grounded members, and the corona starting and extinction voltages. The compression fit between the frustoconical surfaces insures that no low dielectric strength air spaces are present across which flashover can occur at the joint between insulating bushing 41 and connector 40 as a result of shrinkage of the material of insulating body 60 even under the most extreme cold conditions.

Stress relief member 73 forms an increased diameter extension on the grounded outer wrapping of cable 15 which prevents concentration of lines of electrical force at the end of the semiconductive layer 70 and substantially reduces voltage gradients in an axial direction, thereby eliminating costly and difficult-to-fabricate stress cones. The metallic body portion 55 of elbow connector 40 is connected to the grounded cable sheath through stress relief member 73 and draw nut 74, thereby forming a continuation of the cable ground shield, and body portion 55 is electrically connected to the grounded metallic apparatus casing 42 through bridging bar 79 and hold-down springs 80, thereby providing a safe "dead front" connection wherein the outside of the connector is maintained at ground potential and complete safety to operating personnel is guaranteed.

The receptacle 62 is recessed inwardly a much greater axial distance from the end of cable opening 68 than in the structure disclosed in aforementioned application Serial No. 390,145, thereby increasing the creepage distance between the hot connector parts and the grounded stress relief member 73, whereby the effective breakdown strength and the corona starting and extinction voltages are increased. The mating threads on terminal stud 63 and receptacle 62 are surrounded by a tubular portion 82 on interchange member 57 which is at the potential of cable conductor 64. Inasmuch as the voltage gradients are in a radial direction between "hot" tubular portion 82 and grounded body portion 55, the equipotential lines of the electrical field are substantially parallel to the cable conductor, and consequently none of the air within tubular portion 82 adjacent mating threads on receptacle 62 and terminal stud 63 is subject to electrical stress and will not be ionized or give rise to radio noise or generate corona which would initiate deterioration of the insulation.

The threaded joint between receptacle 62 and terminal stud 63 pulls the pencilled, or frustoconical surface 83 on cable insulation 69 snugly against the complementary frustoconical surface which partially defines cable opening 68 in insulating body 60, and the resilient material of insulating body 60 conforms to any irregularities on frustoconical surface 83 and on cable insulation 69 and eliminates voids or air pockets along the creepage path between interchange member 57 and stress relief member 73 along the surface of the cable insulation. Draw nut 74 pulls stress relief member 73 tightly against frustoconical surface 67 on insulating body 60 without requiring relative rotation between these components.

FIG. 3 illustrates an embodiment of the invention which terminates the conductor 52 of a high voltage electrical apparatus insulating bushing rather than a cable and which permits lineman to test whether the electrical apparatus is energized and also facilitates taping a radial feed on an existing distribution system if the electrical apparatus is a distribution transformer. A test cap 110 mates with an insulating bushing 41 on casing 42 having a terminal stud, or bayonet 43 identical to that for the separable connector 40 of the embodiment of FIGS. 1 and 2, and the conductor stud 52 which carries the terminal stud 43 for test cap 110 is preferably connected internally of casing 42 by means not shown to the conductor stud of the insulating bushing for the separable elbow connector 40. Test cap 110 includes an outer member 112 of inverted cup shaped and of suitable conductive material such as aluminum. Outer member 112 is secured to casing 42 by a bridging bar 79 and hold-down springs 80 in a manner identical to which the separable elbow connector 40 is secured. Outer member 112 has an eye portion 113 engageable by a hook stick and surrounds an inner member 114 of conductive material such as copper in spaced relation to the inner surface of outer member 112. Inner member 114 may be held within outer member 112 by a cup-shaped insulating body 116 of the same high dielectric strength and high surface resistivity and resilient silicone rubber material of which the insulating body 60 of the separable connector 40 is comprised and preferably is also poured at the factory. Inner member 114 terminates in a female connector member, or receptacle 44 identical to that of connector 40 and adapted to mate with bayonet 43 of an insulating bushing 41. Insulating body 116 terminates in a frustoconical portion 117 surrounding connector receptacle 44 and adapted to fit within complementary frustoconical compartment 54 in insulating bushing 41, and the frustoconical portion 117 and the mating surface which forms compartment 54 define the same long creepage path between receptacle 44 and outer member 112 as in the embodiment of FIGS. 1 and 2 and also provide the same force fit between surfaces, at least one of which is resilient, that causes the faying surfaces to conform closely and prevent low dielectric strength air occulsions that might generate corona and result in deterioration of the insulation. Test cap 110 and elbow connector 40 are thus interchangeable. A sleeve of insulating material 118 surrounds metallic outer body 112 adjacent the open end thereof.

Hold-down springs 80 and bridging bar 79 normally electrically connect outer member 112 to metallic apparatus casing 42 and thus maintain it at ground potential. Removal of bridging bar 79 and hold-down springs 80 from outer member 122 by means of a hook stick disconnects outer member 112 from ground and creates a capacitor in which outer member 112 is one electrode with insulating body 116 the capacitor dielectric and the electrically energized inner body 114 the other electrode. The tip of a hook stick bridged between outer member 112 and grounded casing 42 will draw a "fuzzing" arc which is clearly visible and audible on a 7200 or 7620 volt system. The capacitor coupling is kept low for safety with the result that on 2400 volt systems the visible and audible response is more difficult to detect, especially in bright sunlight or if the surrounding noise level is high. A glow lamp held by a hook stick in engagement with outer member 112 gives a brilliant response at voltages as low as 2400 volts to indicate to the lineman that the apparatus is energized.

If the electrical apparatus is an electrical transformer and it is desired to tap another feed on an existing distribution system, test cap 110 can be removed and an elbow connector 40, which has been assembled with a primary cable 15, can be mated with the insulating bushing 41 from which the test cap 110 was removed to permit energizing another transformer over the cable 15.

While only a few embodiments of the termination of the invention have been illustrated and described, many modifications and variations thereof will be readily apparent to those skilled in the art, and consequently it is intended in the appended claims to cover all such modifications and variations which fall within the true spirit and scope of the invention.

We claim:

1. In combination, a metallic casing adapted to be connected to ground, an insulating bushing member extending through a wall of said casing, a conductive member extending axially through said bushing member and having a first connector portion at the end thereof exterior of said casing and being adapted to be connected to high voltage electrical apparatus interior of said casing, a separable connector comprising an outer, hollow conductive body member open at both ends, an inner conductive member disposed within and radially spaced inwardly from said outer member having a second connector portion at one end complementary to and normally releasably engaging said first connector portion and a third connector portion at its other end constructed and arranged to receive the conductor of a high voltage cable, tubular insulating means disposed between said inner and outer members and having an axial compartment formed therein and providing access to said third connector portion and adapted to accommodate the insulation of said cable, said tubular insulating means extending beyond said axial compartment wherein said third connector portion is recessed a substantial distance within said axial compartment away from the end of said tubular insulating means, said insulating bushing member and said tubular insulating means having complementary frustoconical surfaces defining a long creepage path between said outer conductive member and said normally engaged conductor portions and one of said frustoconical surfaces being of resilient material, releasable means for urging said separable connector against said insulating bushing member, whereby said complementary frustoconical surfaces are compressed together and conform closely to each other and low dielectric strength air occlusions are prevented along said creepage path, said releasable means electrically connecting said outer member to said casing, said inner member including an annular portion surrounding said third connector portion and isolated by said tubular insulating means from said outer conductive member, whereby electrical stress exists through said tubular insulating means between said annular portion and said outer member and the air is not stressed electrically adjacent said third connector portion when the latter is connected to said high voltage cable.

2. The combination set forth in claim 1 wherein said releasable means electrically connects said outer member to said casing and includes a metallic spring means affixed at one end to said casing and an eye connected to the other end of said spring means and adapted to be engaged and moved by a hookstick from a released position wherein said separable connector can be disengaged from said insulating bushing member to a normal position wherein the force of said spring means is exerted in a direction to urge said outer member against said insulating bushing member.

3. The combination defined by claim 1 wherein said outer member is open at both ends and wherein a portion of said tubular insulating means extends beyond said axial compartment and also has a frustoconical surface, and including a frustoconical conductive hollow stress relief member adapted at its smaller diameter end to fit snugly over the outer conductive wrapping of said electrical cable and including means for releasably connecting the larger diameter end of said stress relief member to said outer member.

4. In the combination defined by claim 1 wherein said third conductor portion is threaded and including a primary cable having a central conductor, insulating means surrounding said conductor, and an outer conductive wrapping, and also including a threaded connector member complementary to and normally engaging said second connector portion and being affixed to a connector carried by said primary cable and wherein said tubular insulating means has a tapered surface partially defining said axial compartment adjacent said annular portion of said inner member and wherein the end of said cable insulation is tapered and complementary to said tapered surface of said insulating means.

5. The combination set forth in claim 1 wherein the widest part of each of said frustoconical surfaces being in substantial registry with the outer surface of said tubular insulating means when said connector portions are normally engaged and the narrowest part of said surfaces being proximate to the surface of said inner conductive member, the continuous radial thickness of insulation at the axial transition between said conductive members and at the widest part of said surfaces being substantially equal to the radial thickness of said tubular insulating means.

6. The combination set forth in claim 1 wherein the annular portion of said inner member comprises a tubular metallic conductor electrically connected to said inner member and disposed in a surrounding relation to said third connector portion.

7. In combination, a metallic casing adapted to be connected to ground, an insulating bushing member extending through a wall of said casing, a conductive member extending axially through said bushing member and having a connector portion at the end thereof exterior of said casing and being adapted to be connected to high voltage electrical apparatus interior of said casing, a separable connector comprising an outer, hollow conductive body member open at both ends, an inner conductive member disposed within and radially spaced inwardly from said outer member and having a first connector portion at one end complementary to and normally releasably engaging said connector portion on said conductive member and a second connector portion at its other end adapted to receive a connector member affixed to the conductor of a high voltage cable, tubular insulating means disposed between said inner and outer members with an axial compartment providing access to said second connector portion and adapted to accommodate the insulation of said cable and a frustoconical portion extending beyond said outer member and surrounding said axial compartment wherein said second connector portion is recessed a substantial distance within said axial compartment away from the end of said frustoconical portion, said insulating bushing member and said tubular insulating means having complementary frustoconical surfaces defining a long creepage path between said outer conductive member and said normally engaged connector portions and one of said frustoconical surfaces being of resilient material, releasable means for urging said outer member against said insulating bushing member and for affixing said separable connector to said casing, whereby said complementary frustoconical surfaces are compressed together and conform closely to each other and low dielectric strength air occulsions are prevented along said creepage path, said releasable means electrically connecting said outer member to said casing, a frustoconical conductive, hollow stress relief member adapted at its smaller diameter end to fit snugly over the outer conductive wrapping of said electrical cable and including means for releasably connecting the larger diameter end of said stress relief member to said outer member, said outer member having threads thereon, and an annular conductive draw nut engaging said stress relief member and normally engaging said threads on said outer member and normally pulling said stress relief member tightly against said frustoconical portion of said insulating means.

8. In the combination defined by claim 7 wherein said second connector portion is threaded and including a primary cable having a central conductor, insulation surrounding said conductor, and an outer conductive wrapping and also including a threaded connector member complementary to and normally engaging said second connector portion and being affixed to said conductor of said primary cable and wherein said tubular insulating means has a tapered surface partially defining said axial compartment adjacent said annular portion of said inner member and wherein the end of said cable insulation is tapered and complementary to said tapered surface of said insulating means.

9. In combination, a metallic casing adapted to be connected to ground, an insulating bushing extending through a wall of said casing and having a conductive member extending axially therethrough provided with a connector portion exterior of said casing and adapted to be connected to high voltage electrical apparatus interior of said casing, a separable connector including a conductive tubular outer member open at both ends, a conductive inner member disposed within said outer member in radially spaced relation thereto, tubular insulating means disposed between said inner and outer conductive members, said inner member having first and second connector portions at its opposite ends and said first connector portion being complementary to and normally releasably engaging said connector portion on said conductive member of said insulating bushing, said bushing and said insulating means having complementary frustoconical surfaces defining a long creepage path between said outer member and said normally engaged connector portions and at least one of said frustoconical surfaces being of resilient material, means for securing said separable connector to said casing and for compressing said complementary frustoconical surfaces together, whereby low dielectric strength air occlusions are prevented along said creepage path, said securing means also electrically connecting said outer member to said casing, an electrical cable having a central conductor, insulation surrounding said conductor, and an outer conductive wrapping adapted to be grounded, said second connector portion being adapted to accommodate a connector member affixed to the conductor of said electrical cable, said insulating means having an axial compartment providing access to said second connector portion and adapted to accommodate said insulation of said cable, said inner and outer members and said tubular insulating means have elbow bends therein, said tubular insulating means having a frustoconical portion extending beyond said outer member in surrounding relation to said axial compartment, a connector member affixed to said cable conductor and normally releasably engaging said second connector portion on said inner member, and a frustoconical conductive hollow stress relief member releasably engaging said outer member at its large diameter end and said cable conductive wrapping at its smaller diameter end and snugly fitting over said frustoconical portion of said insulating means, whereby said stress relief member and said outer member form a continuation of said outer conductive wrapping on said cable.

10. In combination, a metallic casing adapted to be connected to ground, an insulating bushing member extending through a wall of said casing, a conductive member extending axially through said bushing member and having a connector portion at the end thereof exterior of said casing and being adapted to be connected to high voltage electrical apparatus interior of said casing, a separable connector comprising an outer, hollow conductive body member open at both ends, an inner conductive member disposed within and radially spaced inwardly from said outer member and having a first connector portion at one end complementary to and normally releasably engaging said connector portion on said conductive member and a second connector portion at its other end adapted to receive a connector member affixed to the conductor of a high voltage cable, tubular insulating means disposed between said inner and outer members with an axial compartment providing access to said second connector portion and adapted to accommodate the insulation of said cable and a frustoconical portion extending beyond said outer member and surrounding said axial compartment wherein said second connector portion is recessed a substantial distance within said axial compartment away from the end of said frustoconical portion, said insulating bushing member and said tubular insulating means having complementary frustoconical surfaces defining a long creepage path between said outer conductive member and said normally engaged connector portions and one of said frustoconical surfaces being of resilient material, releasable means for urging said outer member against said insulating bushing member and for affixing said separable connector to said casing, whereby said complementary frustoconical surfaces are compressed together and conform closely to each other and low dielectric strength air occlusions are prevented along said creepage path, said releasable means electrically connecting said outer member to said casing, and a frustoconical conductive, hollow stress relief member adapted at its smaller diameter end to fit snugly over the outer conductive wrapping of said electrical cable and including means for releasably connecting the larger diameter end of said stress relief member to said outer member, said outer member, said inner member, and one of said tubular insulating means and insulating bushing member having elbow bends therein.

11. In combination, a metallic casing adapted to be connected to ground, an insulating bushing member extending through a wall of said casing, a conductive member extending axially through said bushing member and having a first connector portion at the end thereof exterior of said casing and being adapted to be connected to high voltage electrical apparatus interior of said casing, terminating means comprising an outer hollow conductive body member, an inner conductive member disposed within and radially spaced inwardly from said outer member and having a second connector portion at one end complementary to and normally releasably engaging said first connector portion, tubular insulating means disposed between said inner and outer members, said insulating bushing member and said tubular insulating means having complementary frustoconical surfaces defining a long creepage path between said outer conductive member and said normally engaged connector portions, one of said frustoconical surfaces being of a resilient material, and releasable means for urging said terminating means against said insulating bushing member, whereby said complementary frustoconical surfaces are compressed together and conform closely to each other and low dielectric strength air occlusions are prevented along said creepage path, said releasable means electrically connecting said outer member to said casing, the widest part of each of said frustoconical surfaces being in substantial registry with the outer surface of said tubular insulating means when said connector portions are normally engaged and the narrowest part of said surfaces being proximate to the surface of said inner conductive member, the continuous radial thickness of insulation at the axial transition between said conductive members and at the widest part of said surfaces being substantially equal to the radial thickness of said tubular insulating means.

References Cited by the Examiner

UNITED STATES PATENTS

| 2,067,614 | 1/1937 | Mascuch | 339—91 X |
| 2,280,711 | 4/1942 | Machlett et al. | 174—75 X |
| 3,033,915 | 5/1962 | Huston | 174—19 X |

FOREIGN PATENTS

| 570,054 | 2/1959 | Canada. |
| 677,989 | 1/1964 | Canada. |
| 948,159 | 1/1964 | Great Britain. |

LARAMIE E. ASKIN, *Primary Examiner.*